United States Patent
Oz et al.

(10) Patent No.: US 10,970,554 B2
(45) Date of Patent: Apr. 6, 2021

(54) METHOD AND SYSTEM FOR AUTOMATICALLY PRODUCING VIDEO HIGHLIGHTS

(71) Applicant: PIXELLOT LTD., Petach Tikva (IL)

(72) Inventors: Gal Oz, Kfar Saba (IL); Yoav Liberman, Tel Aviv (IL); Avi Shauli, Tel Aviv (IL)

(73) Assignee: PIXELLOT LTD., Petach Tikva (IL)

( * ) Notice: Subject to any disclaimer, the term of this patent is extended or adjusted under 35 U.S.C. 154(b) by 169 days.

(21) Appl. No.: 16/311,706

(22) PCT Filed: Jun. 19, 2017

(86) PCT No.: PCT/IL2017/050678
§ 371 (c)(1),
(2) Date: Dec. 20, 2018

(87) PCT Pub. No.: WO2017/221239
PCT Pub. Date: Dec. 28, 2017

(65) Prior Publication Data
US 2020/0311433 A1 Oct. 1, 2020

Related U.S. Application Data

(60) Provisional application No. 62/352,026, filed on Jun. 20, 2016.

(51) Int. Cl.
*G06N 20/00* (2019.01)
*G06K 9/00* (2006.01)
(Continued)

(52) U.S. Cl.
CPC ..... *G06K 9/00751* (2013.01); *G06K 9/00724* (2013.01); *H04N 21/4307* (2013.01);
(Continued)

(58) Field of Classification Search
CPC .................................................. G06K 9/00751
See application file for complete search history.

(56) References Cited

U.S. PATENT DOCUMENTS

| 7,143,354 | B2 | 11/2006 | Li et al. | |
| 8,923,607 | B1 * | 12/2014 | Kwatra | G06K 9/46 382/159 |

(Continued)

FOREIGN PATENT DOCUMENTS

| CN | 1685344 | 10/2005 |
| CN | 101127866 | 2/2008 |

(Continued)

OTHER PUBLICATIONS

International Search Report dated Dec. 7, 2017 for International Application No. PCT/IL2017/050678.

(Continued)

*Primary Examiner* — Eileen M Adams
(74) *Attorney, Agent, or Firm* — Pearl Cohen Zedek Latzer Baratz LLP (57) ABSTRACT

Methods and systems are provided for automatically producing highlights videos from one or more video streams of a playing field. The video streams are captured from at least one camera, calibrated and raw inputs are obtained from audio, calibrated videos and actual event time. Features are then extracted from the calibrated raw inputs, segments are created, specific events are identified and highlights are determined and the highlights are outputted for consumption, considering diverse types of packages. Types of packages may be based on user preference. The calibrated video streams may be received and processed in real time, periodically.

18 Claims, 4 Drawing Sheets

(51) Int. Cl.
*H04N 21/43* (2011.01)
*H04N 21/466* (2011.01)

(52) U.S. Cl.
CPC ..... *H04N 21/4667* (2013.01); *H04N 21/4668* (2013.01); *G06K 2009/00738* (2013.01)

(56) References Cited

U.S. PATENT DOCUMENTS

| | | |
|---|---|---|
| 2003/0034996 A1 | 2/2003 | Li et al. |
| 2004/0085339 A1 | 5/2004 | Divakaran et al. |
| 2009/0060342 A1 | 3/2009 | Chiang et al. |
| 2014/0176708 A1 | 6/2014 | Ramakrishnan et al. |
| 2016/0004911 A1 | 1/2016 | Cheng et al. |
| 2016/0012296 A1 | 1/2016 | Xing et al. |
| 2016/0292510 A1* | 10/2016 | Han ........ G11B 27/06 |
| 2017/0264920 A1* | 9/2017 | Mickelsen ....... H04N 21/44008 |

FOREIGN PATENT DOCUMENTS

| | | |
|---|---|---|
| CN | 101268505 | 9/2008 |
| CN | 101377852 | 3/2009 |
| CN | 105164695 | 12/2015 |
| EP | 1917660 | 5/2008 |
| JP | 2007/060606 | 3/2007 |
| WO | WO 2007/073349 | 6/2007 |
| WO | WO 2007/077965 | 7/2007 |
| WO | WO2007077965 | 7/2007 |

OTHER PUBLICATIONS

Supplementary European Search Report of European Patent Application No. 17814888.8, dated Jan. 24, 2020.

Office Action for Israel Patent Application No. 263851, dated Jun. 30, 2020.

Office Action for Chinese Patent Application No. 2017800500095, dated Nov. 3, 2020.

* cited by examiner

METHOD AND SYSTEM FOR AUTOMATICALLY PRODUCING VIDEO HIGHLIGHTS

CROSS-REFERENCE TO RELATED APPLICATIONS

This application is a National Phase application of PCT International Application No. PCT/IL2017/050678, International Filing Date Jun. 19, 2017, claiming the benefit of U.S. Provisional Patent Application No. 62/352,026, filed Jun. 20, 2016, which is hereby incorporated by reference.

FIELD OF THE INVENTION

Embodiments of the present invention relate to creation of video highlights from one or more video streams of sport events in a playing field. More particularly, embodiments of this inventions related to the automatic production of video highlights for sharing and storage.

BACKGROUND OF THE INVENTION

Highlights video are of growing importance as the amount of sporting and other events continues to increase. As most viewers want to see many of these events, but have only a limited amount of time, video highlights, of the important portions of the event become increasingly important.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a method for automatically producing highlight videos from one or more video streams of a playing field, receiving calibrated raw inputs captured by at least one camera positioned proximate to the playing field, extracting features to transform the calibrated raw inputs into feature vectors, creating segments and identifying specific events in each one of the segments, determining whether each one of the events is a highlight and outputting the highlights for consumption.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The present invention relates to methods, systems, and computer program products for identifying and producing highlights from video streams of sport events in a playing field.

Embodiments of the present invention may comprise or utilize a special purpose or general-purpose computer hardware, such as, for example, one or more processors and system memory, as discussed in greater details below. Embodiments within the scope of the present invention also include physical and other computer readable media for carrying or storing computer-executable instructions and/or data structure. Computer-readable media that store computer-executable instructions are computer storage media.

Computer storage media devices include ROM, RAM, EEPROM, Flash memory, GPU memory and other types of memory.

A "communication network" is defined as one or more data links that enable the transport of electronic data between computer systems and/or modules. When information is transferred, or provided over a network or another communications connection (either hardwired, wireless or any combination of hardwired or wireless) to a computer, the computer properly vies the connection as a transmission medium.

Further, upon reaching various computer system, program code means in form of computer-executable instructions or data structures can be transferred automatically from transmission media to computer storage media devices (or vice versa).

Throughout this document, a "web site" is a related collection of Word Wide Web (www) files that includes a beginning file or a "web page" called a home page, and typically additional files or "web pages". The term "web site" is used collectively to include "web site" and "web page(s)".

Those skilled in the art will appreciate that the invention may be practiced in network computing environment with many types of computer system configurations such as a personal computer (e.g. laptop, desktop, tablet computer), or any type of computing device, including mobile devices that can be readily transported from one location to another location (e.g. smart phone, personal digital assistant (PDA), mobile phone or cellular phone).

A server is typically a remote computer or remote computer system, or computer program therein, in accordance with the "computer" defined above, that is accessible over a communication medium, such as a communication network or other computer network, including the Internet. A "server" provides services to, or performs function for, other computer programs (and their users), in the same or other computers, A server may also include a virtual machine, a software based emulation of a computer.

A central processing unit (CPU) is formed of one or more processors, for example, conventional processors, such as those used in servers, computers and other computerized devices. For example, the processors may include X86 processors from AMD and Intel, Xenon® and Pentium® from Intel, as well as any combinations thereof.

Figure 1:
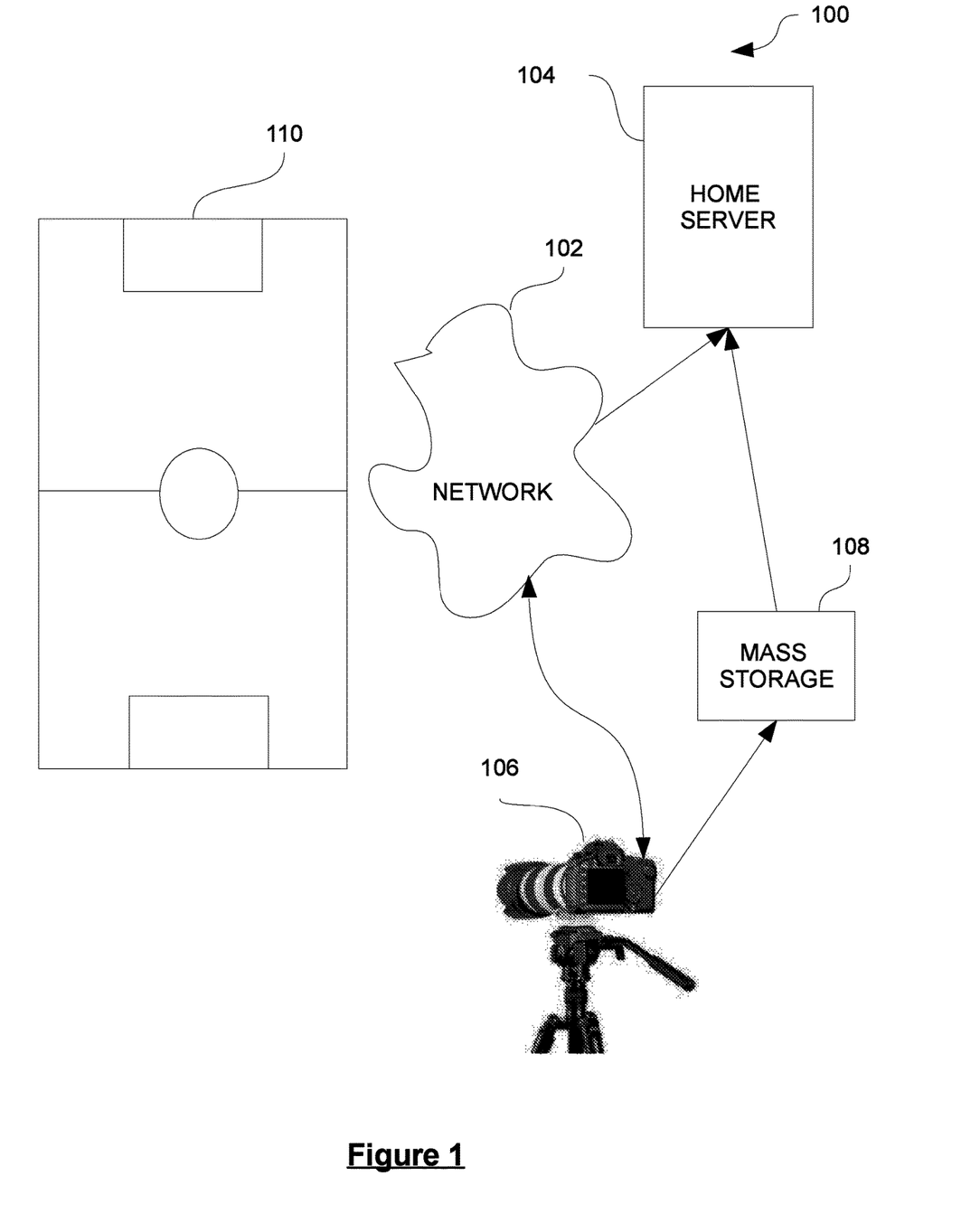
FIG. 1 is a diagram of an exemplary environment for the system in which embodiments of the disclosed subject matter are performed according to aspects of certain embodiments of the present invention.

A graphics processing unit (GPO is a single-chip processor primarily used to manage and boost the performance of video and graphics. The GPU performs all computation and processing which is optimized for graphics calculations and processing. An example GPU is, from NVIDIA of Santa Clara Calif., USA, and includes those from the GeForce™ products. Reference is now made to FIG. 1, which shows a diagram of an exemplary environment for the system 100, including a network 102, to which is linked a home server 104, also known as a main server. The home server 104 perform the various processes in accordance with the present invention. The network 102, is for example, a communication network, such as a Local Area Network (LAN), or a Wide Area Network (WAN), including public networks such as the Internet. As shown in FIG. 1, the network 102, may be a combination of networks and/or multiple networks, including, for example, cellular networks. "Linked" as used herein include both hardwired or wireless links, either direct or indirect, and placing the computers, including servers, components and the like, in electronic and/or data communications with each other.

A camera 106, representing one or more cameras positioned proximate to a playing field 108, to automatically film a sport event, representative of an event for which a video highlight is to be made, is linked to the network 102 to send recorded video to the home server 104 for processing in accordance with the invention. According to another embodiment, the video captured by the camera 106, is placed on a mass storage 110, such as a compact disk, digital virtual disk, or the like and provided to the administrator over the network 102, for processing by the home server 104. In another embodiment, the video is processed in real time. The home server 104 is of an architecture that includes on one or more components, engines, modules and the like, for providing numerous additional server functions and operations. For explanation purposes, the home server 104 may have a uniform resource locator (URL) of, for example, www.hs.com.

Figure 2:
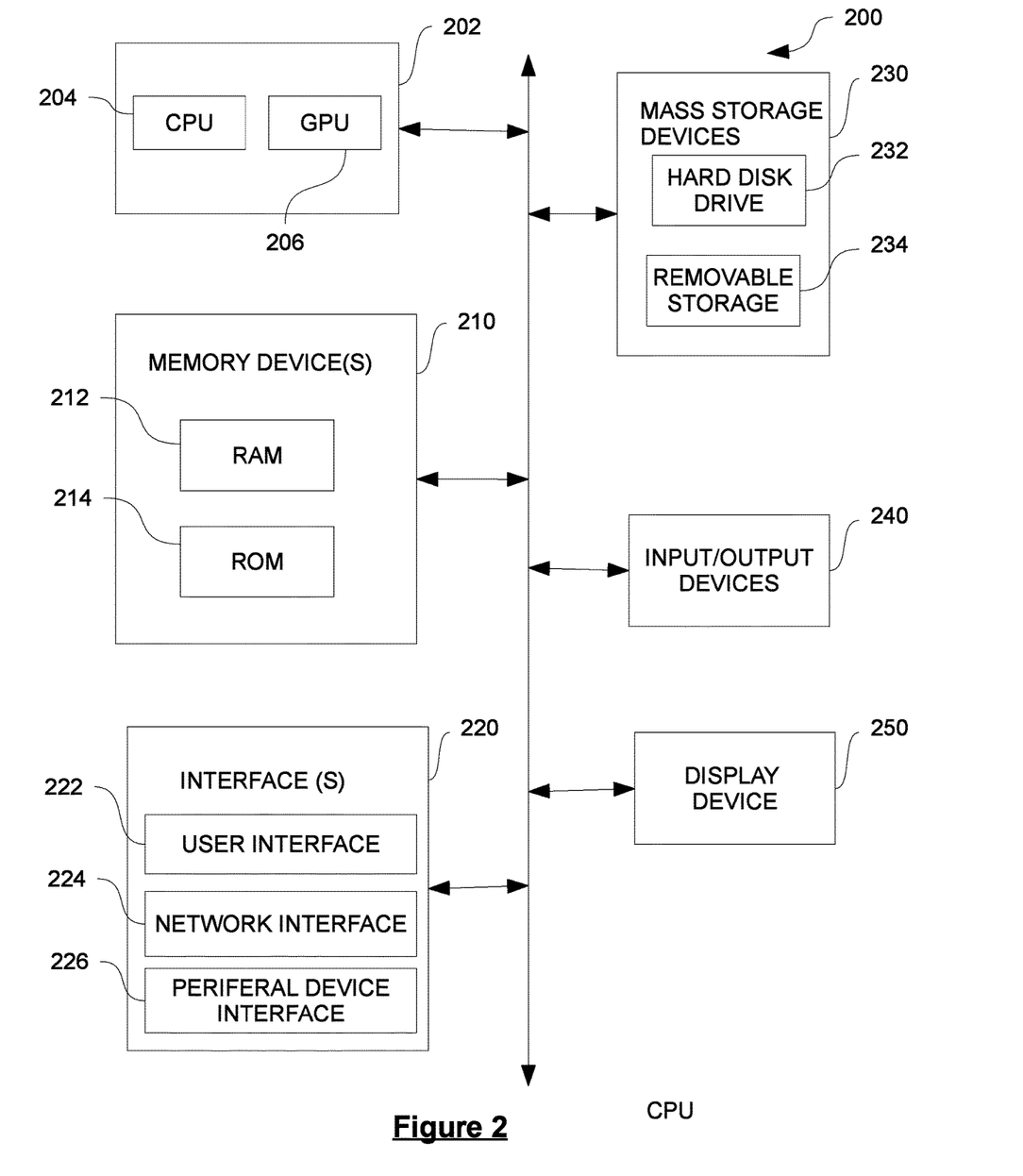
FIG. 2 illustrates an example block diagram of a computing device computer architecture.

Reference is now made to FIG. 2, which illustrates an example block diagram of home server 104. Home server 104 includes a computerized processing unit 202, formed of a central processing unit (CPU) 204, of one or more processors, and a graphic processing unit (GPU) 206, of one or more processors, one or more memory devices 204, one or more interfaces 210, one or more Input/Output devices 226. Processors 202 may also include various types of computer storage media, such as cache memory. The central processing unit 202, is such that the CPU 204 and GPU 206, are, for example, electronically connected, including in electric and/or data communication with each other, as well with the memory devices 214, interfaces 220, mass storage devices 230, I/O devices 240 and display device 250.

The central processing unit 204 is formed of one or more processors, including microprocessors, for performing the home server 104 functions and operations detailed further.

The graphics processing unit (GPU) 206, allows for parallel computing with the CPU 204, such that the computerized processing unit 202 is functional with either or both the CPU 204 and the GPU 206.

Memory devices 210 are associated with the CPU 204 and GPU 206 and include various computer storage media, such as volatile memory and/or non-volatile memory.

Mass storage devices 230 include various computer storage media, such as magnetic disks, optical disks. As depicted in FIG. 1, a particular mass storage device is a hard disk drive 232. Mass storage devices 230 include removable storage 234.

I/O devices 240 include various interfaces that allow home server 104 to interact with other systems, devices and users, such as user interface 222, network interface 224 and peripheral interface 226.

Figure 3:
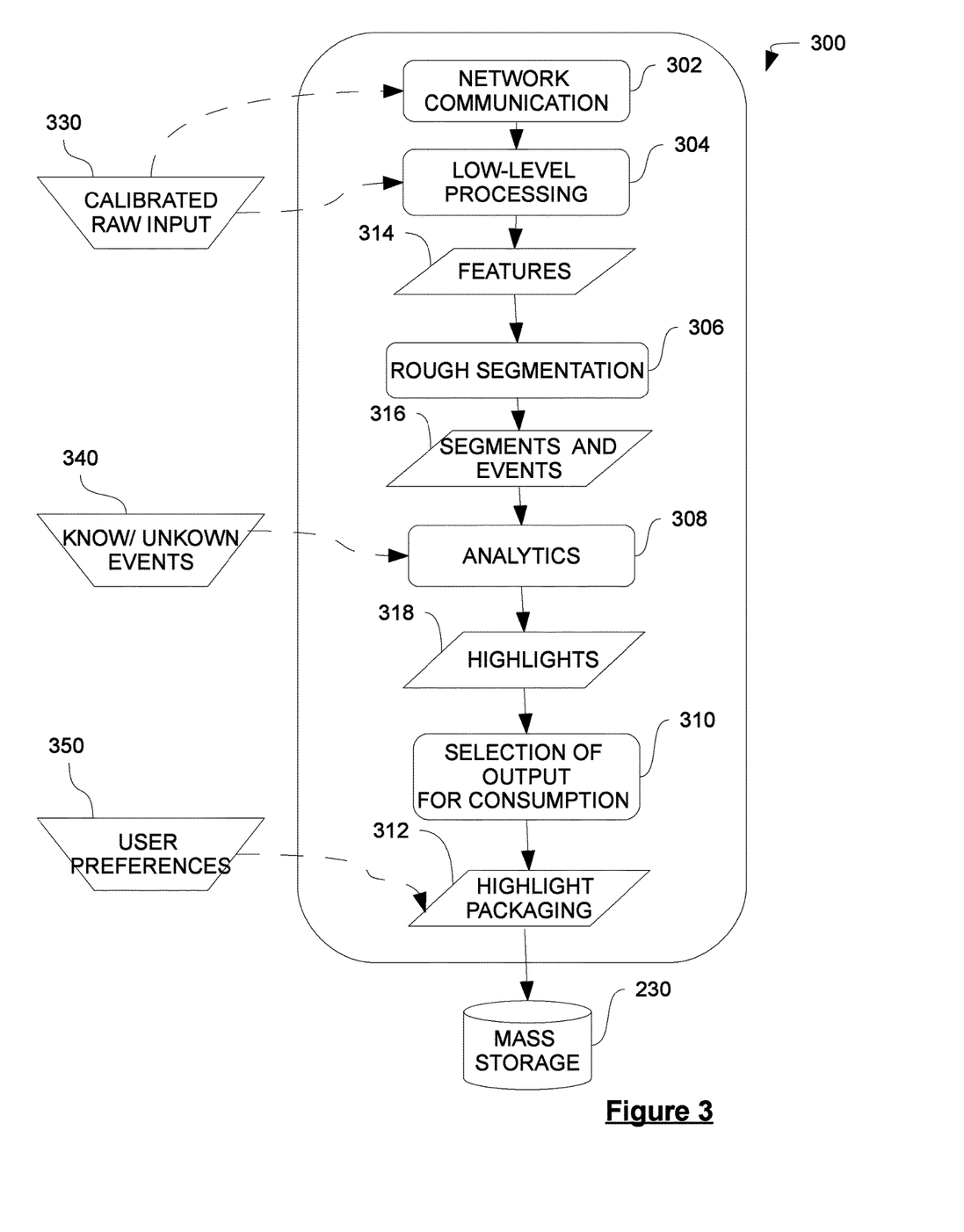
FIG. 3 illustrates an example computer architecture for producing highlights from a video stream of sports events in a playing field.

More specifically, as shown in computer architecture 300, in FIG. 3. Home server 104 includes network communication module 302 (optional), low-level processing module 304, rough segmentation module 306, analytics module 308 and selection of output for consumption 310.

The network communication module 302 handle all communications to and from the home server 104 and is optional.

The low-level processing module 304 extracts features 314. It transforms the calibrated raw inputs 330 into feature vectors (e.g. contours and edges in an input image). For example, the low-level processing module may detect movement around a basketball of a basketball game on a basketball court being filmed.

The rough segmentation module 306 functions for pre-processing the extracted features 314 by the low-level processing module 304. Module 306 applies various thresholds, in accordance with predetermined criteria, to the extracted features 314 to determine whether or not to continue to focus on the event. Remaining with the example referred previously related to the basketball game, the detected feature vector, movement around the basketball, is monitored. Should the movement around the basketball not be sustained, the event is considered a non-event and is dropped. Should the movement around the basketball be sustained, this is an event 316 onward for analytics, to the analytics module 308.

The analytics module 308 functions to determine whether the event is a highlight worthy event 318, for outputting to the selection of output for consumption module 310. According to some embodiments, the analytics module 308 performs its analytics by processes including machine learning or "deep learning". In machine learning, the module is programmed or taught what is an event by programming with large samples of known events and known non-events 340. For example, a machine learning module can decide whether the event is a goal or not a goal in soccer, by experiencing large samples of "goals" and "no goals". Similarly, the noise around the basket video is analyzed to see whether it is a dunk of the ball in the basket. This module, by its machine learning, now determines that the rough segment is a dunk, so that it will now be processed by the selection of output for consumption.

The selection of output for consumption module 310 classifies and tags the highlights 318 received as input from the analytics module 308. According to some embodiments, tagging can be, for example, the participant's e.g. (individual player or the team) time of the highlight, real time and game time, point in the game, field/court location, type of the highlight specific to the game e.g. layup, dunk and the sample probability of an event. Further the module 310 determines how the highlight is to be used, e.g. type of packaging. According to an embodiment, the usage is, as a highlight in a highlight film, condensed game, replay, commercial time break, player specific highlights, and the like. The output of module 310 is highlight packaging 312, and can be stored in mass storage 230 or in the cloud (not shown). It can be used for sharing with others, such as, for example, via social media sites, websites, video sharing sites or elsewhere.

According to some embodiment, a user may be prompted to select the outputted highlights desired and the type of packaging (user preferences 340).

Figure 4:
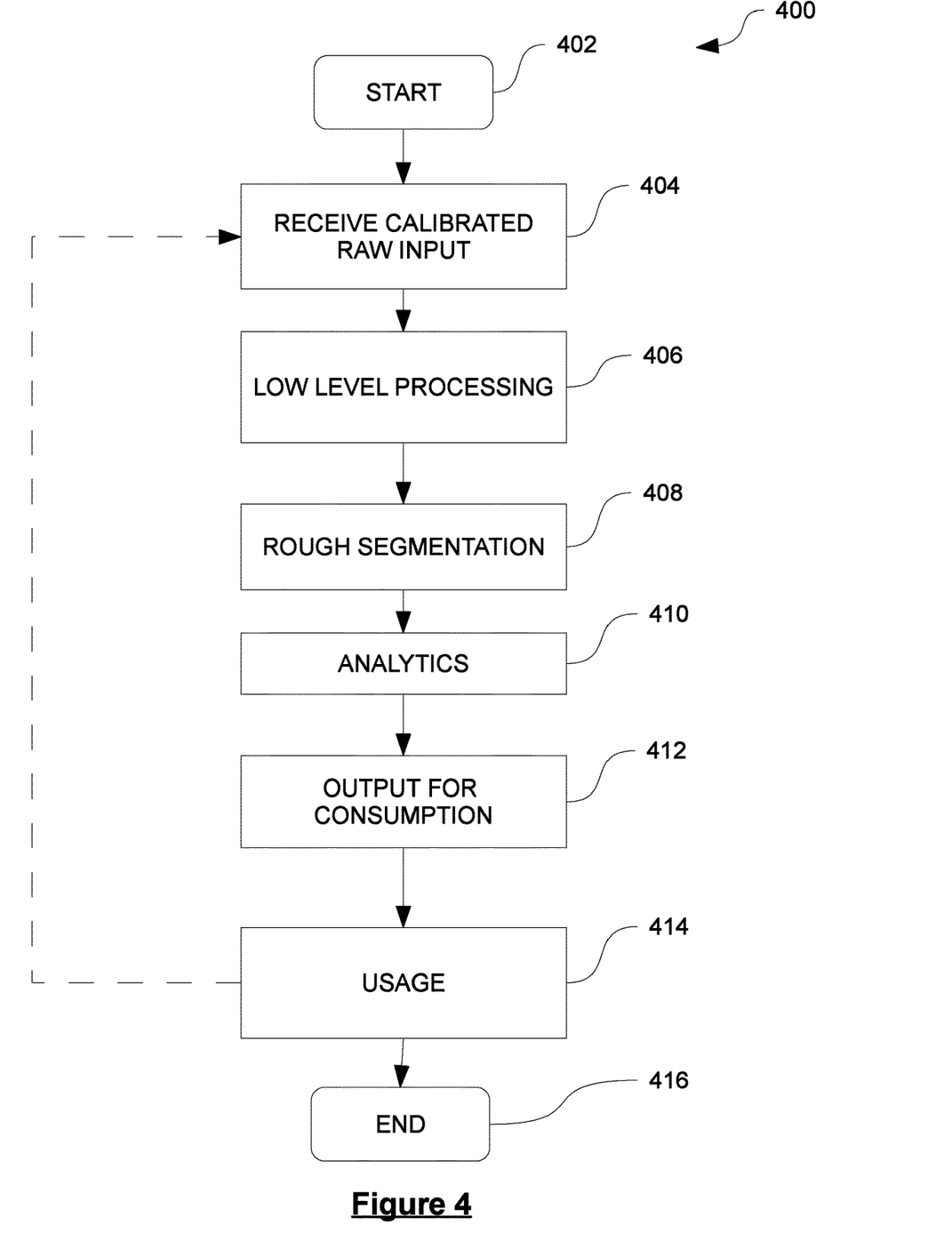
FIG. 4 illustrates a flow chart of an example method for producing highlights from a video stream of sport events in a playing field.

FIG. 4 illustrates a flow chart of an example method 400 for producing highlight videos from a video stream of a playing field.

The method of FIG. 4 begins at the START block 402. According to some embodiment, the method is done in real-time, meaning receiving continuously raw inputs 404 every predefined time and going through all the blocks.

At block 402, the camera(s) are calibrated, such that specific points (locations) on the playing field/court transform to the image from the camera(s), The audio is also synchronized with the video. This is a necessary preparation stage.

The method then moves to block 404 where the home server 104 receives calibrated raw inputs, in form of calibrated video, typically with audio of the event, as well as the actual event time. The audio is typically coordinated with the video, as well as other occurrences, such as scoreboard changes (in the case of a sporting event). The audio includes ambient audio, e.g. the noise generated by the event itself, including noise from the playing field generated by the players and crowd noise, commentary from broadcasters and the like. The video includes the players, various areas of the playing field in which a camera has been concentrated, video of the crowd, for example, sitting and standing and moving therebetween. There are also occurrences in the event, such as scoreboard changes and relative times during the game, such as periods, such as halves, quarters and other divisions, e.g. beginning, middle, end, of the full game time. The input, for example, also includes crowd tagging as detailed further, scoreboard video, game clock video, end user collected statistics, such as from social media.

The method moves to block 406, where low-level processing 406 is performed by the home server 104. In this low-level processing, the calibrated raw inputs are broken into features, for example, image and visual features, audio, and scoreboard changes, relative game times, e.g. periods in the game. According to some embodiment, the low-level processing 406 is as follow:

Video captured from camera(s) 110, calibrated video: processing of calibrated video is such that the video is processed with knowledge regarding each point in the camera field of view, such that it is known how each point transforms into the camera image. For example, video is processed knowing certain areas of the playing field, knowing certain players, for example star or key performance plyers, by Jersey number or other identifier, knowing how various players move on the field, identifying important locations on the field, such as goal nets, center circles. The calibrated video includes also processing distinct player movements, specific to the game, such as taking a shot on goal, jumping near a basket to dunk the ball in the net. Also processed are global artifacts, such as breaks in the game when entertainment such as cheerleaders or other groups perform, non-game events such as contests, indoor blimps flying in the arena, t-shirts and hot dogs, and other objects being distributed to the crowd.

Ambient audio: processing of ambient audio includes analyzing the ambient audio for audio levels (amplitudes and frequencies) and rises and fall thereof, such as crowd sounds, in the form of cheers and applause, sounds at breaks, such as timeouts, play stoppages, crowd singing, music being played indicate of goals, the game being "over", music to excite the crowd to cheer the team on and build momentum, on field whistles, player noises including ball noises and shouts, referees 'whistles, and the like.

Commentator/broadcaster audio, known here as Commentator Audio: processing of commentator audio includes analyzing the voice level of the commentator, as high pitches and fast speech is typically indicative of an important event. The same holds true analyzing the commentator audio for voice inflections. Also, the commentator audio can be analyzed for speech with specific words such as "score", "goal", "basket" and the like indicative of important events in the game. Also, the speech recognition can also be programmed to look for commentator specific phrases, such as long drawn out pronunciation of the word "goal", a phrase known for one particular soccer commentator.

Scoreboard: the scoreboard is watched from changes in the score, the time in the game, game time events, such as ends of periods, times of play stoppage, timeouts and the like. The scoreboard is analyzed to determine the relative time of the game to see what events have been taken place based on the game time. The scoreboard can be used to determine in-game streaks, such as a team scoring rapidly in a short time, which may be indicative of a highlight.

Crowd tagging: crowd tagging involves receiving input associated with certain events in the game. For example, members of the crowd may comment on a goal scored at particular time, these crowd comments may be via social networks, such as Facebook®, Instagram®, and Twitter, which are tied to various time points in the game, for example, by looking at the actual time of day and comparing it with the actual times of the social media posts.

Player tracking: in player tracking, the home server 104 looks for specific players and their specific movements, such as when they speed up, slow down, or move to various positions on the field. For example, if a player is on the offensive side of the field, for significant amounts of time, he may be scoring goals, or assisting with goal scoring, which is the subject matter for a highlight. Also, player substitutions and the time of the substitution may be indicative of an important event. For example, in basketball, a player who has played a good game is typically substituted at the end of the game, so the crowd can give that player cheers, applause and the like.

The method then moves to block 408 where the home server 104 performs rough segmentation. Segments are created based on the low-level processing 406 of the video, and the specific events in each segment are identified. For example, should there be video with ambient and commentator noise for a certain period, this may be a segment worth identifying as a segment and identifying the specific events in the segment. Should this segment pass a predetermined threshold, the segment is maintained as a possible segment for a highlight.

The method then moves to block 410, where analytics, according to an embodiment, is performed by a machine learning process such as a deep learning process, where at this stage, a new feature vector is extracted from the original calibrated raw input data. A determination whether some segment is a highlight or not is derived from this new feature vector. The machine learning process may be performed on a deep learning network which learns, using an offline process, whether different segments are defined as highlights (or not). "Deep Learning" as used herein, is a branch of machine learning based on a set of algorithms that attempt to model high-level abstractions in data by using multiple processing layers, with complex structures or otherwise, composed of multiple non-linear transformations.

The aforementioned deep learning is, for example, a two-step process. The first step is a learning step, where highlights are characterized as specific events (typically by human input), with each specific event being learned. The home server 104 is ultimately trained to recognize specific events having learned certain events from large sized samples of learned events. According to an embodiment, signal features, image features, audio features and video features are put into a feature bucket, and the feature bucket goes into a deep learning mechanism. The more inputted events for learning, the probability for a highlight classification error is minimized Additionally, highlights may be weighted and filtered as a final step to determine whether they are highlights. Next, the deep learning results are applied to the segment, to determine whether it is a highlight and what type of highlight it is, such as a goal, a good play, or the like.

Once the deep learning is completed, the method moves to block 412, where the events, determined to be highlights by the deep learning process, are output for consumption. The outputted highlights include associated classification decisions and metadata indicating the type of highlight that the outputted highlight is.

The method then moves to block 414, where the type of packaging is selected. According to one embodiment, it is based on predefined default type. According to another embodiment, it is based on user preferences, e.g. the user is prompted by the system to select the outputted highlights desired, and the type of packaging for the highlights. The packaging may be, for example, a condensed game where all the actions of the game are considered and a short version telling the "story" of the game (usually between five to ten minutes) is created; specific relays where the system identifies that there is no active game e.g. timeout, and introduces a highlight as a replay; a highlight film, focusing on exciting moments to the user; a personal clip, for example, a clip focusing on a specific player, with some game highlights or a series of action which is surrounded by time for airing commercials.

According to one embodiment, the method moves to block 416 where it ends. According to another embodiment, where videos are processed in real time, the method moves to block 404 to process the next calibrated raw inputs.

Implementation of the method and/or system of embodiments of the invention can involve performing or completing selected tasks manually, automatically, or a combination thereof. Moreover, according to actual instrumentation and equipment of embodiments of the method and/or system of the invention, several tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system.

In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. A display and/or a user input device such as keyboard or mouse are optionally provided as well.

While certain features of the invention have been illustrated, and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for automatically producing highlight videos from one or more video streams of a playing field, comprising:
   receiving calibrated raw inputs captured by at least one camera positioned proximate to the playing field, wherein the calibrated raw inputs include audio, calibrated video and actual event time and wherein the audio and the calibrated video are synchronized;
   extracting features to transform the calibrated raw inputs into feature vectors by applying low-level processing, wherein said low-level processing comprises utilizing pre-existing knowledge regarding points within the field of view of said at least one camera and therefrom identifying and extracting features, the pre-existing knowledge including: knowledge about areas of the playing field, knowledge about certain players, and knowledge about how various players move around the playing field;
   creating segments from the feature vectors and identifying specific events in each one of the segments by applying rough segmentation;
   determining whether each one of the events is a highlight by applying analytics algorithms; and,
   outputting the highlights for consumption and determining types of packages to be outputted for consumption.

2. The method of claim 1, wherein the receiving of calibrated raw inputs is performed in real-time every predefined time period.

3. The method of claim 1, wherein the types of packages include at least one of:
   condensed game;
   replays;
   a highlight film; and,
   a personal clip.

4. The method of claim 1, further comprising determining the types of packages based on user preferences.

5. The method of claim 1, wherein determining whether each of the events is a highlight is further based on deep learning process.

6. The method of claim 1, wherein the audio includes ambient audio.

7. The method of claim 1, wherein the audio includes commentator audio.

8. The method of claim 1, wherein the captured raw inputs include at least one of:
   specific players;
   various areas of the playing field;
   scoreboard;
   game clock;
   motion pictures of players' activities in the playing field;
   relative times; and,
   user collected statistics.

9. The method of claim 1, further comprising storing the raw input in a storage medium, and providing access though a communication network.

10. A system for automatically producing highlight videos from one or more video streams of a playing field, comprising:
   a home server including one or more processors;
   one or more non-transitory computer-readable media storing one or more sets of instructions which, when executed by one or more processors, cause the one or more processors to perform:
      receiving calibrated raw inputs captured by at least one camera positioned proximate to the playing field, wherein the raw inputs include audio, calibrated video and actual event time and wherein the audio and the calibrated video are synchronized;
      extracting features to transform the calibrated raw inputs into feature vectors by applying low-level processing, wherein said low-level processing comprises utilizing pre-existing knowledge regarding points within the field of view of said at least one camera and therefrom identifying and extracting features, the pre-existing knowledge including: knowledge about areas of the playing field, knowledge about certain players, and knowledge about how various players move around the playing field;
      creating segments from the feature vectors and identifying specific events in each one of the segments by applying rough segmentation;
      determining whether each one of the events is a highlight by applying analytics algorithms; and,
      outputting the highlights for consumption and determining types of packages to be outputted for consumption.

11. The system of claim 10, wherein the receiving of the calibrated raw inputs is performed in real-time every predefined time period.

12. The system of claim 10, wherein the types of packages include at least one of:
   condensed game;
   replays;
   a highlight film; and
   a personal clip.

13. The system of claim 10, further comprising determining the types of packages based on user preferences.

14. The system of claim 10, wherein determining whether each of the events is a highlight is further based on deep learning process.

15. The system of claim 10, wherein the audio includes ambient audio.

16. The system of claim 10, wherein the audio includes commentator audio.

17. The system of claim 10, wherein the captured raw inputs include at least one of:
   specific players;
   various areas of the playing field;
   scoreboard;
   game clock;
   motion pictures of players' activities in the playing field;
   relative times; and,
   user collected statistics.

18. The system of claim 10, further comprising:
   a network communication; and,
   wherein the one or more processors further perform:
      storing the calibrated raw inputs in a storage medium; and,
      providing access though the communication network.

* * * * *